United States Patent [19]

Roberts et al.

[11] Patent Number: 4,965,103
[45] Date of Patent: Oct. 23, 1990

[54] UNITARY COMPOSITE MOLDING STRIP

[75] Inventors: Edward A. Roberts, Mt. Clemens, Mich.; Douglas W. Spittal, Clearwater, Canada; Stanley T. Kisiel, Livonia, Mich.

[73] Assignee: Color Custom, Inc., Warren, Mich.

[21] Appl. No.: 231,279

[22] Filed: Aug. 12, 1988

Related U.S. Application Data

[63] Continuation-in-part of Ser. No. 114,500, Oct. 30, 1987.

[51] Int. Cl.$^5$ ............................................ B60R 13/04
[52] U.S. Cl. ........................................ 428/31; 52/716; 156/244.11; 264/177.2; 293/128
[58] Field of Search .................. 49/490, 491; 52/208, 52/716; 428/31; 156/244.11; 264/177.1, 177.2; 293/128

[56] References Cited

U.S. PATENT DOCUMENTS

| | | | |
|---|---|---|---|
| 3,547,516 | 12/1970 | Shanok et al. | 428/31 X |
| 4,087,223 | 5/1978 | Angioletti et al. | 264/275 X |
| 4,269,897 | 5/1981 | Gans et al. | 428/31 X |
| 4,381,273 | 4/1983 | Azzola | 428/188 X |
| 4,470,943 | 9/1984 | Preis | 264/162 |
| 4,560,596 | 12/1985 | Coscia | 428/124 X |
| 4,563,141 | 1/1986 | Zoller | 428/31 X |
| 4,581,807 | 4/1986 | Adell | 49/462 X |
| 4,643,659 | 2/1987 | Paul | 264/171 X |
| 4,708,894 | 11/1987 | Mabuchi et al. | 428/31 |
| 4,748,062 | 5/1988 | Menjo et al. | 428/31 X |
| 4,781,952 | 11/1988 | Coscia et al. | 428/67 X |

Primary Examiner—Henry F. Epstein
Attorney, Agent, or Firm—Brooks & Kushman

[57] ABSTRACT

Extrusion method and apparatus and molding strip produced by the method and apparatus wherein an outer polyurethane plastic layer is interbonded at its inner surface to the outer surface of a flexible PVC plastic body. A single die is utilized to produce the molding strip. The polyurethane plastic layer and the flexible PVC plastic body are interbonded while in a molten state within a bonding chamber of the die so that the polyurethane plastic layer does not separate from the PVC plastic body during use of the molding strip. The polyurethane plastic layer is interbonded with the PVC plastic body without totally encapsulating the PVC plastic body so that the molding strip can be adhesively secured to a side body panel at the PVC plastic body. The outer surface of the polyurethane plastic layer can be painted to match the color of the side body panel. Preferably, a reinforcement strip is embedded in the PVC plastic body within the bonding chamber to give the molding strip additional strength.

6 Claims, 3 Drawing Sheets

UNITARY COMPOSITE MOLDING STRIP

CROSS-REFERENCE TO RELATED APPLICATIONS

This application is a continuation-in-part application of U.S. patent application entitled EXTRUSION METHOD AND APPARATUS AND PART PRODUCED THEREBY, U.S.S.N. 114,500, filed Oct. 30, 1987.

TECHNICAL FIELD

This invention relates to an extrusion method and apparatus and molding strip produced thereby and, in particular, to an extrusion method and apparatus for producing a molding strip which includes an outer plastic layer interbonded with a plastic body by interfusion.

BACKGROUND ART

Plastic side molding strips are provided for various manufactured articles such as appliances and motor vehicles in order to minimize damage to a side body panel of the article from inadvertent, slight contact. In order to enhance the appearance of such molding strips, it is desirable to have the color of the molding strip match the color of the side body panel.

Frequently, a clear PVC totally encapsulates the molding strip in order to prevent separation between the underlying plastic body and the clear PVC. However, total encapsulation of the plastic body by the clear PVC is undesirable for a number of reasons including inefficient use of the clear PVC.

One proposed alternative to total encapsulation is to use multiple dies, the last one of which applies a top coat of clear PVC to the extruded plastic body.

One disadvantage of this method is that the clear plastic layer has a tendency to separate from its underlying plastic body during use of the molding strip, especially when the molding strip encounters impact at extreme temperatures or when the molding strip is used around corners having a relatively small radius.

The U.S. Patents to Angioletti et al 4,087,223, Gans et al 4,269,897, Azzola 4,381,273, Preis 4,470,943, Zoller 4,563,141, Adell 4,581,807 and Paul 4,643,659 all deal with extrusion of more than one type of plastic to form a resulting plastic part. For example, the U.S. Patent to Azzola discloses a sealing strip, including a channel-shaped attachment profile of rubber in which a metallic reenforcement strip is embedded. The profile has an external coating layer of sponge rubber with an outer surface rendered velvety by abrasion.

DISCLOSURE OF THE INVENTION

An object of the present invention is to provide an improved method and apparatus for continuous composite molding of a molding strip which includes a plastic layer interbonded to an underlying plastic body by interfusion and wherein a single die is utilized to produce the molding strip.

Another object of the present invention is to provide an improved method and apparatus for continuous composite molding of a molding strip having a plastic layer interbonded to an underlying plastic body by interfusion and wherein the molding is performed in such a fashion so that the plastic layer does not separate from the plastic body during use of the molding strip.

Yet still another object of the present invention is to provide an improved method and apparatus for continuous composite molding of a molding strip including a polyurethane plastic layer and an underlying flexible PVC plastic body wherein the molding strip is produced in a relatively cost-efficient fashion (i.e. it is not necessary nor desirable to totally encapsulate the PVC plastic body with the polyurethane plastic).

In carrying out the above objects and other objects of the present invention, a method for continuously forming a composite molding strip is provided. The method utilizes a single extrusion die which includes first and second passages communicating the outer surface of the die with a common bonding chamber formed in the die. The method includes the steps of extruding a molten flexible PVC plastic through the first passage and into a bottom portion of the bonding chamber and extending a molten, polyurethane plastic through the second passage and into the top portion of the bonding chamber. The PVC plastic has an outer surface and the polyurethane plastic has an inner surface in the bonding chamber. The PVC plastic is interbonded with the polyurethane plastic by interfusion between the surfaces while in the molten state to form the molding strip.

Further in carrying out the above objects and other objects of the present invention, an extrusion die for use in forming the continuous composite molding strip along a forming axis is provided. The molding strip has a flexible PVC plastic body having an outer surface and an outer polyurethane plastic layer having an inner surface. The die includes a bonding chamber therewithin and a first passage extending from the outer surface of the die and into a bottom portion of the bonding chamber to receive the flexible PVC plastic in molten form. A second passage extends from the outer surface of the die into a top portion of the bonding chamber to receive the polyurethane plastic. The die further includes a means or mechanism for directing the flow of the molten polyurethane plastic from the second passage into the bonding chamber in a direction parallel to the forming axis. A bottom portion of the mechanism at least partially defines an opening extending along the forming axis and communicating the first passage with the bonding chamber. The PVC plastic and the polyurethane plastic are interbonded by interfusion between the surfaces within the bonding chamber to form the molding strip.

Still further in carrying out the above objects and other objects of the present invention, a continuous composite molding strip is provided. The molding strip includes a body of PVC plastic having an outer surface and a polyurethane plastic layer having an inner surface overlying the outer surface of the PVC body. The plastic polyurethane layer is interbonded with the PVC plastic body by interfusion between the surfaces while in a molten state to form the molding strip.

Preferably, a third passage communicates the outer surface of the die with the common bonding chamber to allow the feeding of a reenforcing strip through the third passage and into the lower portion of the bonding chamber while the PVC plastic is in the molten state to provide added strength to the molding strip.

Also, preferably, the polyurethane plastic layer is clear and may be painted to match the color of the side body panel to which the molding strip is to be attached. One outer surface of the plastic body is free of the plastic layer to provide a surface for the adhesive binding of the molding strip to the side body panel. The body of the molding strip is formed from flexible PVC plastic.

The above extrusion method and apparatus and molding strip provide numerous advantages. For example, the molding strip is produced with a single die. Also, the plastic layer does not separate from the plastic body during use of the molding strip. Furthermore, the molding strip can be produced in a cost-efficient fashion without wasting plastic material.

Other advantages of the present invention can be readily appreciated as the same becomes better understood by reference to the following detailed description when considered in connection with the accompanying drawings.

BEST MODE FOR CARRYING OUT THE INVENTION

Figure 1:
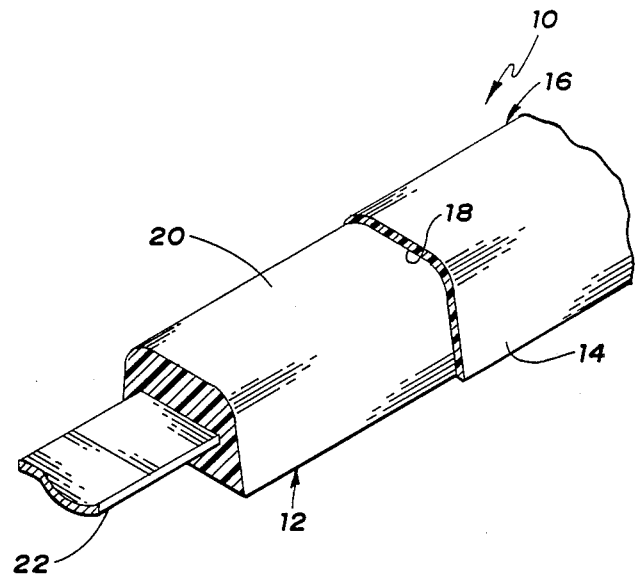
FIG. 1 is a perspective, broken-away view of a molding strip constructed in accordance with the method and apparatus of the present invention.
Figure 2:
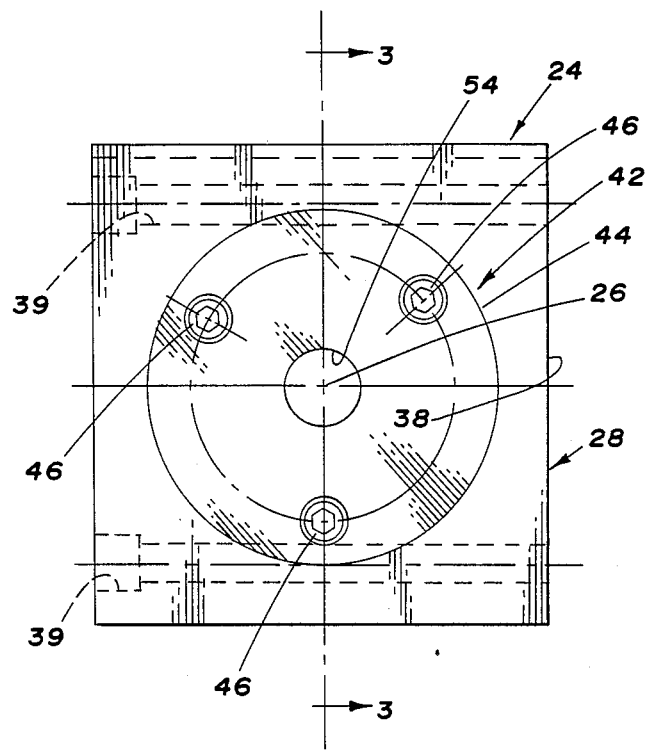
FIG. 2 is a first end view of the die for making the molding strip of FIG. 1.
Figure 3:
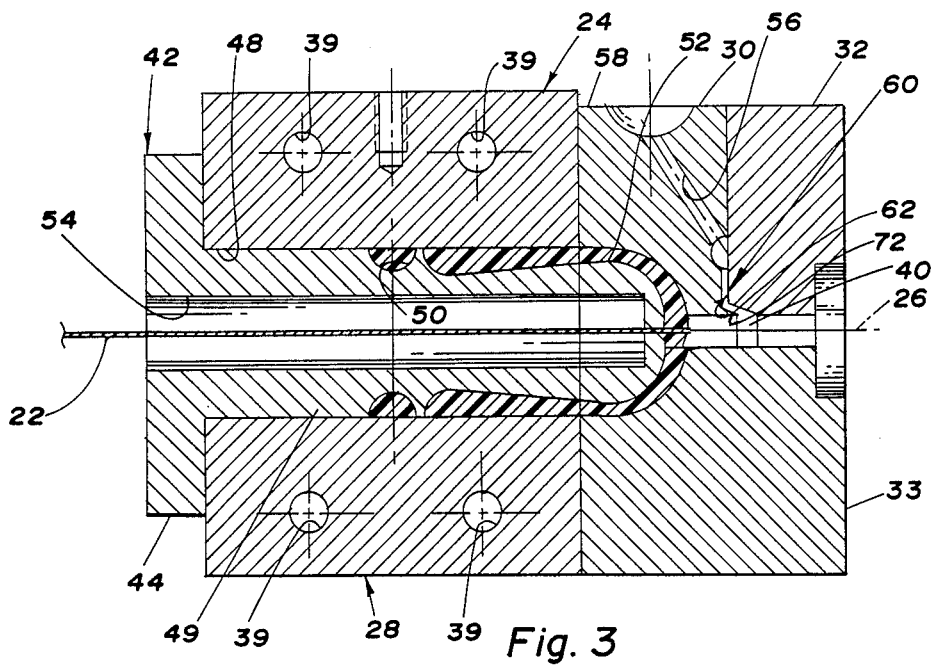
FIG. 3 is a side sectional view of the die utilized in accordance with the method of the present invention.

Referring now to the drawing figures, there is illustrated in FIG. 1 a continuous, composite molding strip, generally indicated at 10, constructed in accordance with the present invention. The molding strip 10 may be utilized as a vehicle body side molding to protect a vehicle side body panel, for example. However, it is to be understood that the molding strip 10 can also be used on other products and goods, such as appliances and the like.

The molding strip 10 includes a body, generally indicated at 12, preferably of a black plastic, such as black flexible PVC, BOCMS 2-8 Type VI grade EU30L. However, it is to be understood that a different flexible plastic, such as polyurethane, can also be utilized with the present invention.

The molding strip 10 also preferably includes a top layer, generally indicated at 16, of a clear plastic such as polyurethane (and has the grade EUC). The plastic top layer 16 is interbonded to the plastic body 12 by interfusion between a bottom or inner surface 18 of the top layer 16 and a top or outer surface 20 of the plastic body 12 while both plastics are in the molten state.

Bonding by interfusion between the surfaces 18 and 20, in effect, causes the top plastic layer 16 and the plastic body 12 to act as a single piece of resilient plastic and is thereby effective to absorb shocks to the top or outer surface 14 of the top layer 16 without damage to the molding strip 10.

The molding strip 10 also includes a reenforcing strip 22 which extends along the longitudinal length or axis of the molding strip 10 and is embedded within the plastic body 12 to thereby strengthen the molding strip 10. The strip 22 is preferably an aluminum metal strip.

Referring now to FIGS. 2 through 7, there is illustrated an extrusion die, generally indicated at 24, for forming the molding strip 10 along a forming axis 26. The extrusion die 24 includes a crosshead, generally indicated at 28, first and second extrusion plates 30 and 32, respectively, and an extrusion block 33, all of which are held together by bolts 34 and dowels 35 (only one of which is shown). Bolts (not shown) extend through holes 39 for securing the crosshead 28 and, consequently, the die 24 to the discharge end of the extruder (not shown) for the molten PVC plastic for the body 12.

Figure 4:
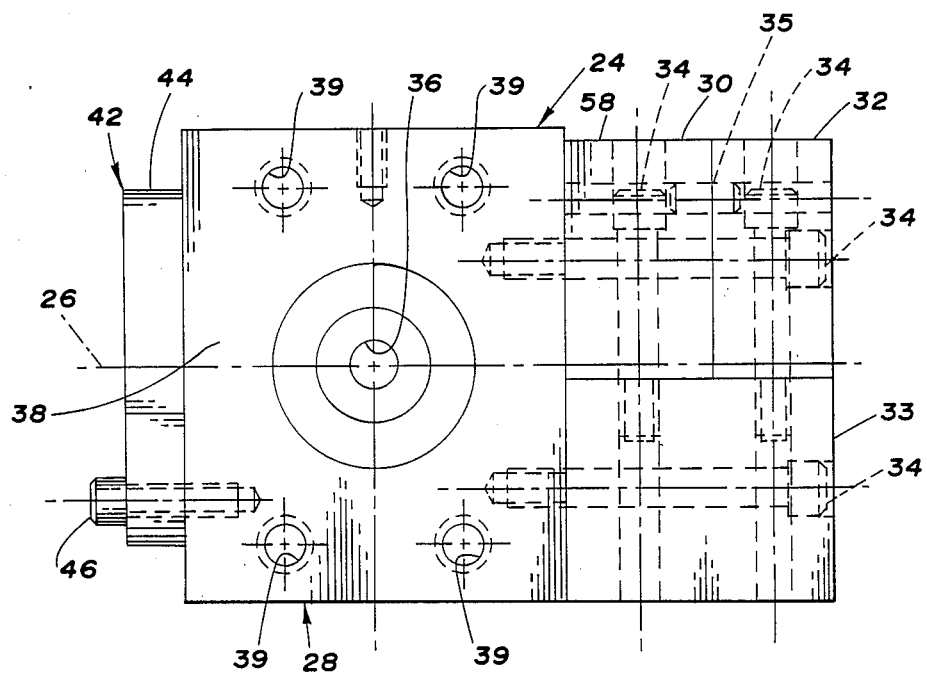
FIG. 4 is a side elevational view of the die of FIG. 3 with various apertures indicated by phantom lines.
Figure 5:
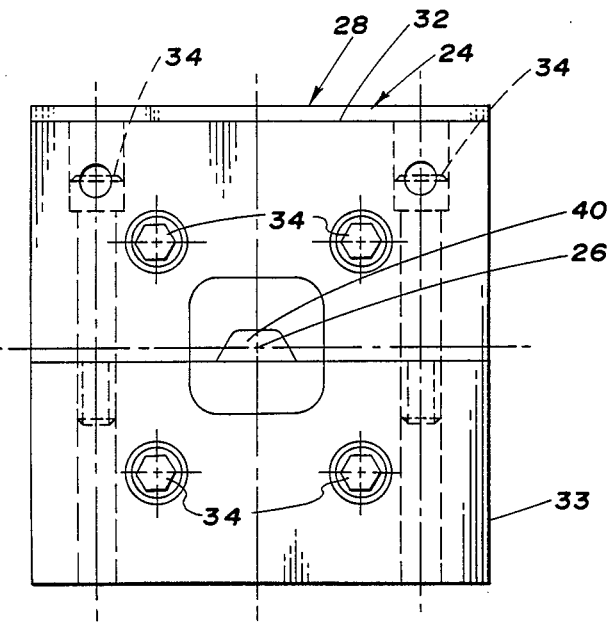
FIG. 5 is a second end view of the die.
Figure 6:
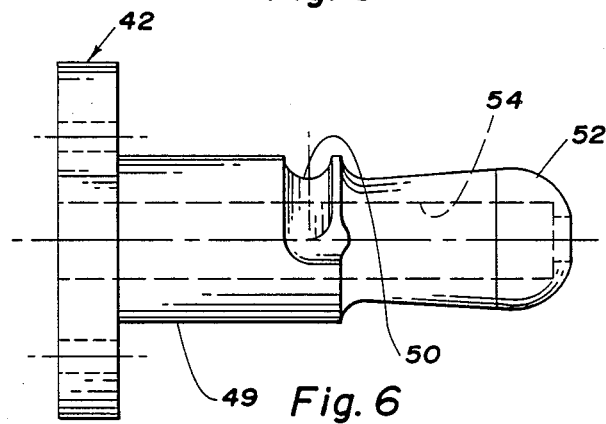
FIG. 6 is a side elevational view of a part of the die of FIGS. 3, 4 and 5.
Figure 7:
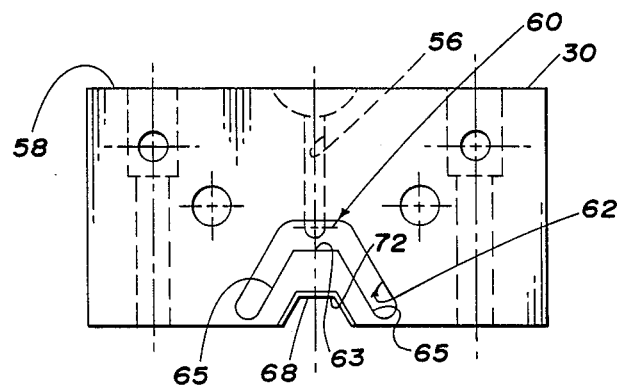
FIG. 7 is an inner end view of a plate of the die of FIGS. 3, 4 and 5.

The crosshead 28 includes a first passage, generally indicated at 36 in FIG. 4, which extends from an outer surface 38 of the crosshead 28 into a bottom portion of a bonding chamber 40 formed in the second plate 32.

The die 24 also includes a tube or snorkel, generally indicated at 42. A head portion 44 of the snorkel 42 is secured by bolts 46 to the crosshead 28 to retain the snorkel 42 against an inner cylindrical surface 48 formed in the crosshead 28. The outer periphery of a cylindrical portion 49 of the snorkel 42 cooperates with the inner surface 48 of the crosshead 28 to define a circular groove 50 for receiving and directing the molten PVC plastic from a direction transverse the forming axis 26 to a direction parallel with the forming axis 26.

The snorkel 42 also includes a hollow end cap member 52 which is fitted at one end of the snorkel 42 and further defines a passage 54 formed in the snorkel 42 along the forming axis 26. The end cap member 52 directs the molten plastic thereover along the passage 36 and into the molding or bonding chamber 40.

The passage 54 extends through the snorkel 42 to receive and direct the metal strip 22 from the exterior of the die 24, through the hollow end cap member 52 and into the chamber 40.

Another passage 56 is cooperatively formed by the first plate 30 and the second plate 32 to communicate the top outer surface 58 of the first plate 30 with the bonding chamber 40. The first plate 30 includes a directing means or mechanism, generally indicated at 60 which has an aperture, generally indicated at 62 which communicates the passage 56 with the bonding chamber 40. The aperture 62 extends in a direction perpendicular to the forming axis 26 to permit the passage of the clear molten polyurethane plastic therethrough and into a top portion of the bonding chamber 40.

The aperture 62 includes side branches 65 and an interconnecting middle branch 63 which are defined by the opposing surfaces of the first and second plates 30 and 32, respectively. The branches 63 and 65 allow for the even distribution of clear molten plastic over the top and side surfaces of a lower portion 68 of the directing mechanism 60. The lower portion 68 of the directing mechanism 60 directs the flow of the clear molten plastic from its downwardly flowing direction in the passage 62 to a direction parallel to the forming axis 26.

The bottom surface of the lower portion 68 of the directing mechanism 60 at least partially defines an opening 72 which extends along the forming axis 26 and communicates the first passage 36 with the bonding chamber 40.

Within the bonding chamber 40 the molten PVC plastic and the clear molten polyurethane plastic are interbonded by interfusion between their contacting inner and outer surfaces respectively, to form the molding strip 10 of FIG. 1.

The advantages accruing to the use of the present invention are numerous. For example, a single die is utilized to produce the molding strip 10. Also, the plastic body 12 and the plastic layer 16 are interbonded in such a fashion such that the layer 16 and the body 12 do not separate during use of the molding strip 10. Furthermore, it is not necessary, nor desirable, to fully encapsulate the plastic body 12 with the plastic layer 16 to form a shock-absorbing molding strip. Plastic material is saved and the plastic layer 16 may be painted to the same color as the side body panel to which the strip 10 is secured. The strip 10 is adhesively secured to the panel 10 at the unencapsulated surface of the plastic body 12.

While the best mode for carrying out the invention has been described in detail, those familiar with the art to which this invention relates will recognize various alternative designs and embodiments for practicing the invention as defined by the following claims.

What is claimed is:

1. A unitary, composite molding strip consisting essentially of:
    a PVC extruded plastic body having an outer surface; and
    a polyurethane plastic layer co-extruded with the body of extruded plastic in a single die and having an inner surface overlying the outer surface of the PVC plastic body, the polyurethane plastic layer being interbonded with the PVC plastic body by interfusion between the surfaces while the plastic body is in a completely molten state and the plastic layer is in a completely molten state during co-extrusion in the single die to form the molding strip and to prevent the plastic layer from separating from the interbonded plastic body during use of the molding strip.

2. The molding strip as claimed in claim 1 wherein the plastic of the body is flexible PVC plastic.

3. The molding strip as claimed in claim 2 wherein the plastic of the layer is clear polyurethane plastic.

4. The molding strip as claimed in claim 1 further comprising a reinforcing strip extending along a longitudinal axis of the molding strip and embedded within the PVC plastic body.

5. The molding strip as claimed in claim 4 wherein the reinforcing strip is a metal reinforcing strip flexible in a direction perpendicular to the longitudinal axis of the molding strip.

6. The molding strip of claim 1 further comprising:
    an outer surface of the plastic body free of the plastic layer and having a surface for an adhesive.

* * * * *